United States Patent
McPheeters et al.

(10) Patent No.: US 9,813,013 B2
(45) Date of Patent: Nov. 7, 2017

(54) SOLAR PANEL INSTALLATION SYSTEMS AND METHODS

(71) Applicant: Sunrun South LLC, San Luis Obispo, CA (US)

(72) Inventors: Greg McPheeters, Santa Clara, CA (US); Geno Viscuso, Shingle Springs, CA (US)

(73) Assignee: Sunrun South LLC, San Luis Obispo, CA (US)

( * ) Notice: Subject to any disclaimer, the term of this patent is extended or adjusted under 35 U.S.C. 154(b) by 0 days.

(21) Appl. No.: 14/819,396

(22) Filed: Aug. 5, 2015

(65) Prior Publication Data

US 2016/0043687 A1    Feb. 11, 2016

Related U.S. Application Data

(60) Provisional application No. 62/033,311, filed on Aug. 5, 2014, provisional application No. 62/075,607, filed on Nov. 5, 2014, provisional application No. 62/138,065, filed on Mar. 25, 2015, provisional application No. 62/187,995, filed on Jul. 2, 2015.

(51) Int. Cl.

| | |
|---|---|
| A47F 5/00 | (2006.01) |
| H02S 20/23 | (2014.01) |
| F16B 2/06 | (2006.01) |
| F16B 2/18 | (2006.01) |
| H02S 20/30 | (2014.01) |
| H02S 30/10 | (2014.01) |
| F24J 2/52 | (2006.01) |
| F24J 2/46 | (2006.01) |

(52) U.S. Cl.
CPC .............. *H02S 20/23* (2014.12); *F16B 2/065* (2013.01); *F16B 2/185* (2013.01); *F24J 2/5245* (2013.01); *F24J 2/5264* (2013.01); *H02S 20/30* (2014.12); *H02S 30/10* (2014.12); *F24J 2002/4663* (2013.01); *F24J 2002/4672* (2013.01); *Y02B 10/12* (2013.01); *Y02E 10/47* (2013.01)

(58) Field of Classification Search
CPC .......... H02S 20/23; H02S 20/30; H02S 30/10; F16B 2/065; F16B 2/185; F16M 13/022
USPC ........................................................ 52/173.3
See application file for complete search history.

(56) References Cited

U.S. PATENT DOCUMENTS

| | | | | |
|---|---|---|---|---|
| 5,556,222 A | * | 9/1996 | Chen ...................... | B62K 25/02 403/157 |
| 6,017,008 A | * | 1/2000 | Farley .................... | A61B 17/02 248/229.21 |

(Continued)

OTHER PUBLICATIONS

Definition of "bore" provided by the Free Dictionary and found at: http://www.thefreedictionary.com/bore.*

*Primary Examiner* — Brian Mattei
(74) *Attorney, Agent, or Firm* — Kramer Levin Naftalis & Frankel LLP

(57) ABSTRACT

Solar panel installation systems are disclosed that reduce or eliminate the need for large, costly rails for mounting solar panels on an installation surface. The systems may include an array of framed solar modules supported above an installation surface using a number of height-adjustable base members. Adjacent solar modules in the array may be coupled to one another at or near their corners using module links that can structurally couple the frames of the adjacent solar modules together.

11 Claims, 11 Drawing Sheets

(56) References Cited

U.S. PATENT DOCUMENTS

| | | | | |
|---|---|---|---|---|
| 6,277,069 B1* | 8/2001 | Gray | ............ | A61B 17/02 |
| | | | | 403/391 |
| 7,314,331 B1* | 1/2008 | Koros | ............ | A61B 19/26 |
| | | | | 403/385 |
| 7,758,502 B2* | 7/2010 | Phillips | ............ | F16B 2/185 |
| | | | | 248/229.2 |
| 2009/0078299 A1* | 3/2009 | Cinnamon | ............ | F24J 2/5211 |
| | | | | 136/244 |
| 2012/0102853 A1* | 5/2012 | Rizzo | ............ | F24J 2/5245 |
| | | | | 52/173.3 |
| 2013/0011187 A1* | 1/2013 | Schuit | ............ | F16B 2/065 |
| | | | | 403/287 |
| 2013/0112248 A1* | 5/2013 | McPheeters | ............ | F16B 2/065 |
| | | | | 136/251 |
| 2014/0041706 A1* | 2/2014 | Haddock | ............ | F24J 2/5258 |
| | | | | 136/244 |
| 2014/0202525 A1* | 7/2014 | Janssens | ............ | F24J 2/5256 |
| | | | | 136/251 |

\* cited by examiner

SOLAR PANEL INSTALLATION SYSTEMS AND METHODS

CROSS-REFERENCE TO RELATED APPLICATIONS

This application claims the benefit of U.S. Provisional Patent Application Ser. No. 62/033,311, entitled "Solar Panel Installation Systems and Methods," filed Aug. 5, 2014, the disclosure of which is incorporated by reference herein in its entirety; U.S. Provisional Patent Application Ser. No. 62/075,607, entitled "SOLAR PANEL INSTALLATION SYSTEMS AND METHODS," filed Nov. 5, 2014, the disclosure of which is incorporated by reference herein in its entirety; U.S. Provisional Patent Application Ser. No. 62/138,065, entitled "TILED ROOF MOUNTING SYSTEMS," filed Mar. 25, 2015, the disclosure of which is incorporated by reference herein in its entirety; and U.S. Provisional Patent Application Ser. No. 62/187,995, entitled "SOLAR PANEL INSTALLATION SYSTEMS AND METHODS," filed Jul. 2, 2015, the disclosure of which is incorporated by reference herein in its entirety. This application is related to U.S. Patent Application Ser. No. 14/819,397 filed Aug. 5, 2015, the disclosure of which is incorporated by reference herein in its entirety, and U.S. patent application Ser. No. 14/819,398 filed Aug. 5, 2015, the disclosure of which is incorporated by reference herein in its entirety.

BACKGROUND OF THE DISCLOSURE

Solar panel installations typically require framed solar panels, or modules, mounted on complex base structures assembled from posts, rails, clamps, and other fasteners. A significant portion of the cost of these solar panel installations may be attributed to the rails, which are often very long extruded or roll-formed members. Aside from the cost of manufacturing the rails, their considerable length can add to the cost of shipping materials to the installation site and add difficulty to the installation process. Accordingly, railless solar panel installation systems could beneficially reduce the costs of manufacturing, shipping, and installing solar panels.

SUMMARY OF THE DISCLOSURE

The solar panel installation systems disclosed herein may include an array of solar modules suspended above an installation surface using a number of height-adjustable base members. The height-adjustable base members may be attached to the installation surface and used to support the solar modules at desired levels above the installation surface.

A height-adjustable base member may include a leveling mechanism coupled to a base plate that may be affixed to the installation surface with one or more fasteners. A slidable attachment member configured to engage a lip of a solar module may be physically coupled to the top of the leveling mechanism to attach the solar modules to the height-adjustable base member.

Adjacent solar modules may be attached to one another at or near their corners using module links, thereby transforming the individual module frames into a system-wide structural members that help spread local loads throughout the system thereby reducing or eliminating the need for separate mounting rails. The module links may be attached to two or more solar modules and secured in place using mid clamps clamped between adjacent solar modules.

BRIEF DESCRIPTION OF THE DRAWINGS

For a fuller understanding of the inventive embodiments, reference is made to the following description taken in connection with the accompanying drawings in which.

DETAILED DESCRIPTION OF THE PREFERRED EMBODIMENTS

Figure 1:
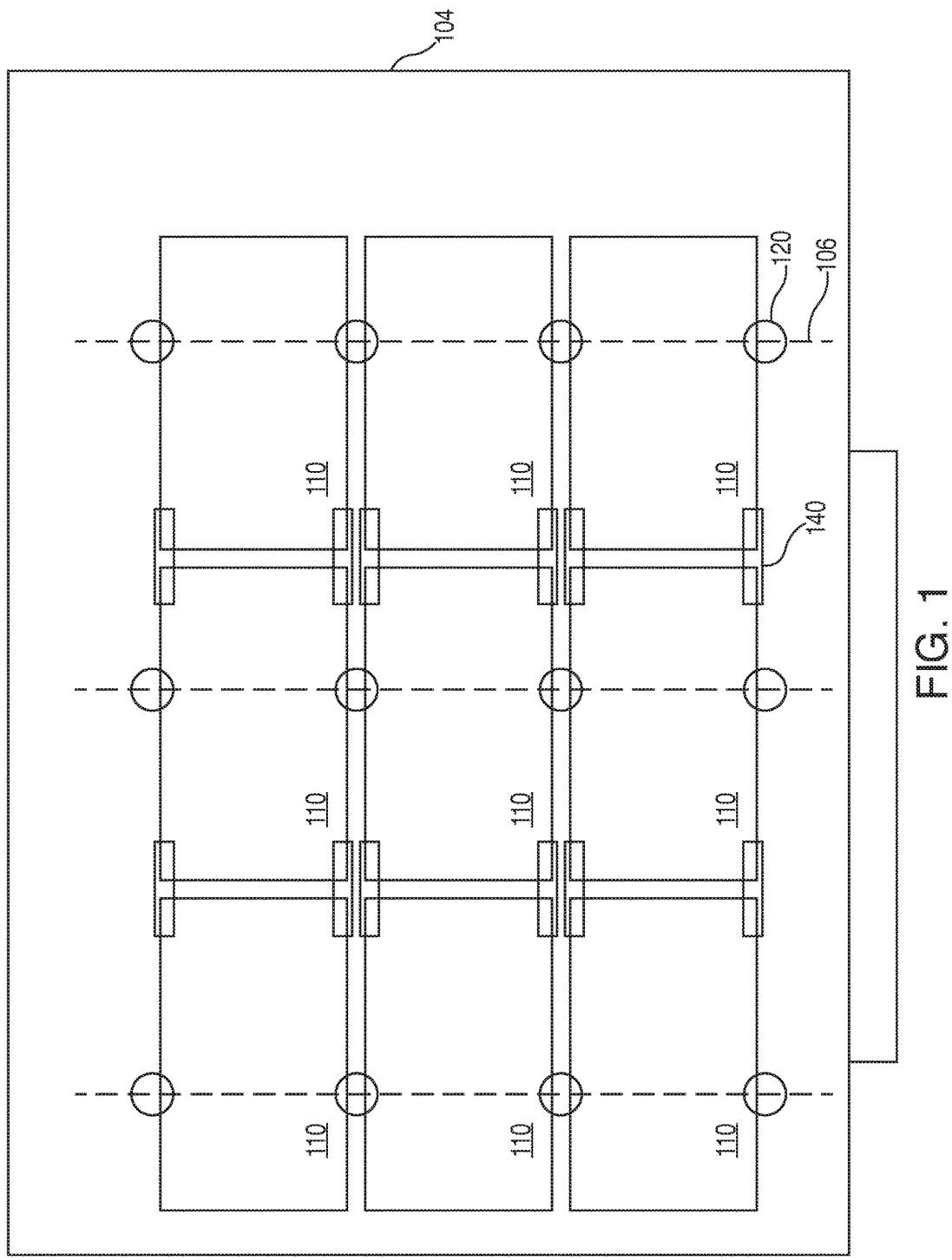
FIG. 1 shows a schematic top plan view of a solar panel installation system, in accordance with various embodiments.

FIG. 1 shows a schematic top plan view of solar panel installation system 100, in accordance with various embodiments. System 100 may include an array of solar modules 110 mounted above installation surface 104 using a number of height-adjustable base members 120. Adjacent solar modules may be coupled together at or near their corners using module links 140.

Solar modules 110 may each include an array of electricity-generating solar cells covered with a protectant material, such as tempered glass or a laminate material, for example. The array of solar cells may be supported underneath and enclosed about the perimeter with a frame. Solar modules 110 are typically rectangular-shaped structures having four corners but other shapes are possible and explicitly contemplated for use with the embodiments disclosed herein.

Solar modules 110 may be supported above installation surface 104, which may be a roof or the ground, for example, using height-adjustable base members 120. Height-adjustable base members 120 can attach to the frames of solar modules 110 at locations along their edges. Depending on environmental and regulatory requirements, a suitable number of height-adjustable base members 120 can be provided along each edge of each solar module 110. For example, a single height-adjustable base member 120 may be provided along each long edge of solar modules 110 with zero members being provided along each short edge, as shown in FIG. 1. In another example, two height-adjustable base members 120 may be provided along each long edge of solar modules 110 with one member being provided along each short edge.

Height-adjustable base members 120 may be height-adjustable in order to level the array of solar modules 110, taking into account irregularities in installation surface 104 and/or in the frames of solar modules 110. In some embodiments, height-adjustable base members 120 may also provide a tilt for the array of solar modules 110 to increase their exposure to sunlight. Height-adjustable base members 120 may also be physically coupled to installation surface 104. In some embodiments, height-adjustable base members 120 may be secured to structural members of installation surface 104, such as roof rafters 106, for example.

As depicted in FIG. 1, solar modules 110 may be arranged in a grid-shaped array with each corner solar module being edgewise adjacent to two other solar modules and diagonally adjacent to one other solar module, each non-corner edge solar module being edgewise adjacent to three other solar modules and diagonally adjacent to two other solar modules, and each interior solar module being edgewise adjacent to four other solar modules and diagonally adjacent to four other solar modules. Locations in the array where the corners of solar modules 110 are closest to one another in the array may be referred to herein as intersections.

Solar modules 110 may be attached to one another at or near their corners using module links 140. Module links 140 may attach to the frames of solar modules 110 to provide structural coupling between the any two edgewise adjacent solar modules 110 or all four adjacent solar modules at each interior intersection and between two edgewise adjacent solar modules 110 at each edge intersection. Coupling solar modules 110 together in this manner can transform the array of independent solar modules 110 into a single structural member that advantageously spreads loads throughout system 100, thereby reducing or eliminating the need for long, expensive mounting rails.

Figure 2:
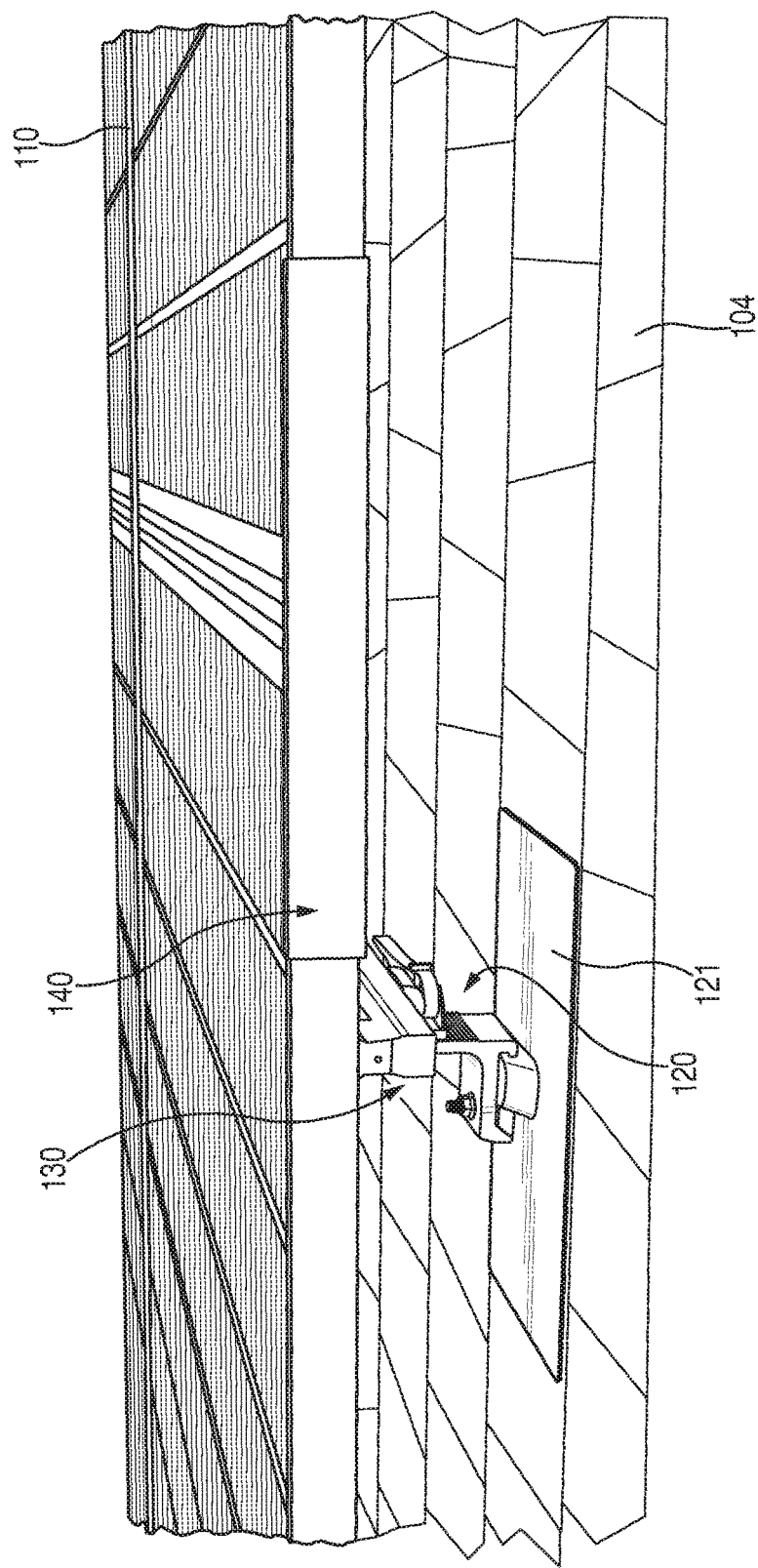
FIG. 2 shows a perspective view of a solar panel installation system 100, in accordance with various embodiments.

FIG. 2 shows a perspective view of system 100, including solar module 110 supported by height-adjustable base member 120, in accordance with various embodiments. Height-adjustable base member is configured to be installed on an installation surface using an aperture-less flashing—namely, base plate 121. Height-adjustable base member 120 may slidably receive slidable attachment member 130, which may, in turn, slidably receive a portion (e.g., a flange) of frame 112 (shown in FIGS. 9A-9D) of solar module 110. Accordingly, height-adjustable base member 120 can support an edge of solar module 110 above the installation surface in a height-adjustable manner. Advantageously, system 100 does not require any holes to be made in the flashing, which can significantly reduce the potential for moisture to reach installation surface 104 below base plate 121 thereby eliminating a major source of leaks in commercial and residential roof-mounted solar panel installations.

Figure 3A:
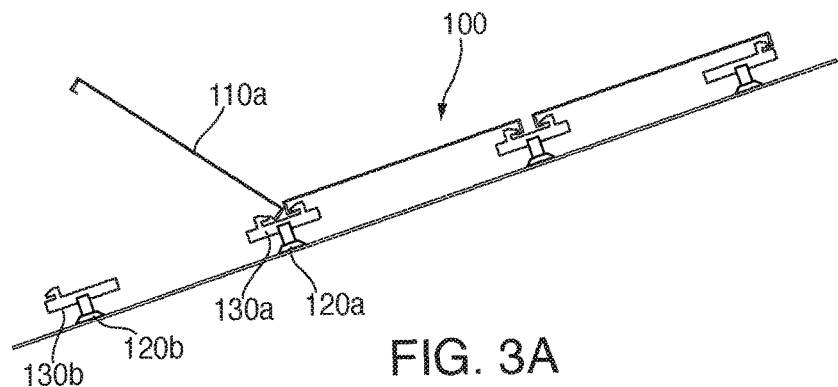
FIGS. 3A-3C show schematic cross-sectional views of a solar panel installation system, including several solar modules being mounted to an installation surface using height-adjustable base members and slidable attachment members, in accordance with various embodiments.
Figure 3B:
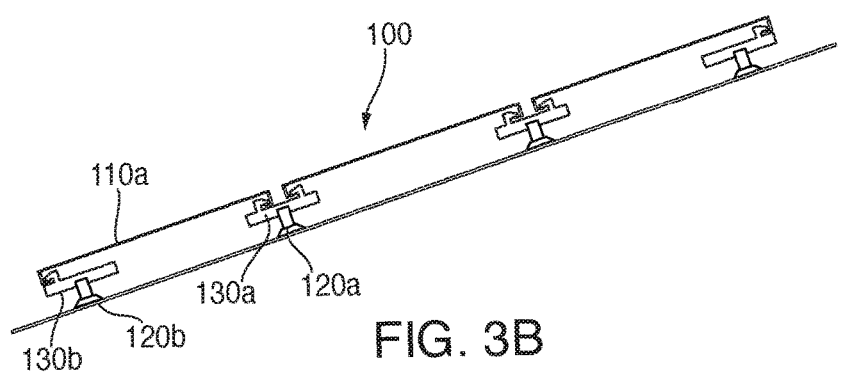
Figure 3C:
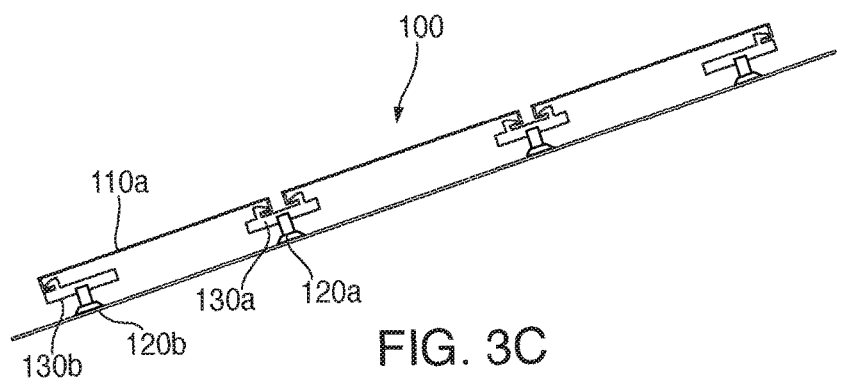

FIGS. 3A-3C show schematic cross-sectional views of system 100, including several solar modules 110 being mounted to installation surface 104 using height-adjustable base members 120 and slidable attachment members 130, in accordance with various embodiments. In particular, FIGS. 3A-3C depict a typical installation progression for system 100 in which a solar module (i.e., solar module 110a) is brought into engagement with a first slidable attachment member 130a mounted above height-adjustable base member 120a, rotated down toward a second slidable attachment member 130b mounted above height-adjustable base member 120b, and the solar module being locked into place by virtue of at least one component of slidable attachment member 130 retaining the frame of module 110a. All modules in the array can be installed using the same general procedure.

It should be understood that while FIGS. 3A-3C depict height-adjustable base member 120 and slidable attachment member 130, the same basic installation method and module array configuration depicted here is applicable to the various height-adjustable base member and slidable attachment member embodiments disclosed in U.S. patent application Ser. No. 14/819,397 filed Aug. 5, 2015, which has been incorporated by reference herein in its entirety. Furthermore, although certain height-adjustable base members and slidable attachment members are depicted and described in conjunction in the following descriptions and drawings, one of skill in the art will appreciate that in some embodiments, the height-adjustable base members and slidable attachment members can be interchanged. Additionally, the lever locking mechanism described below may be used with one or more of the combinations of height-adjustable base members and slidable attachment members disclosed in the above-referenced application.

Figure 4:
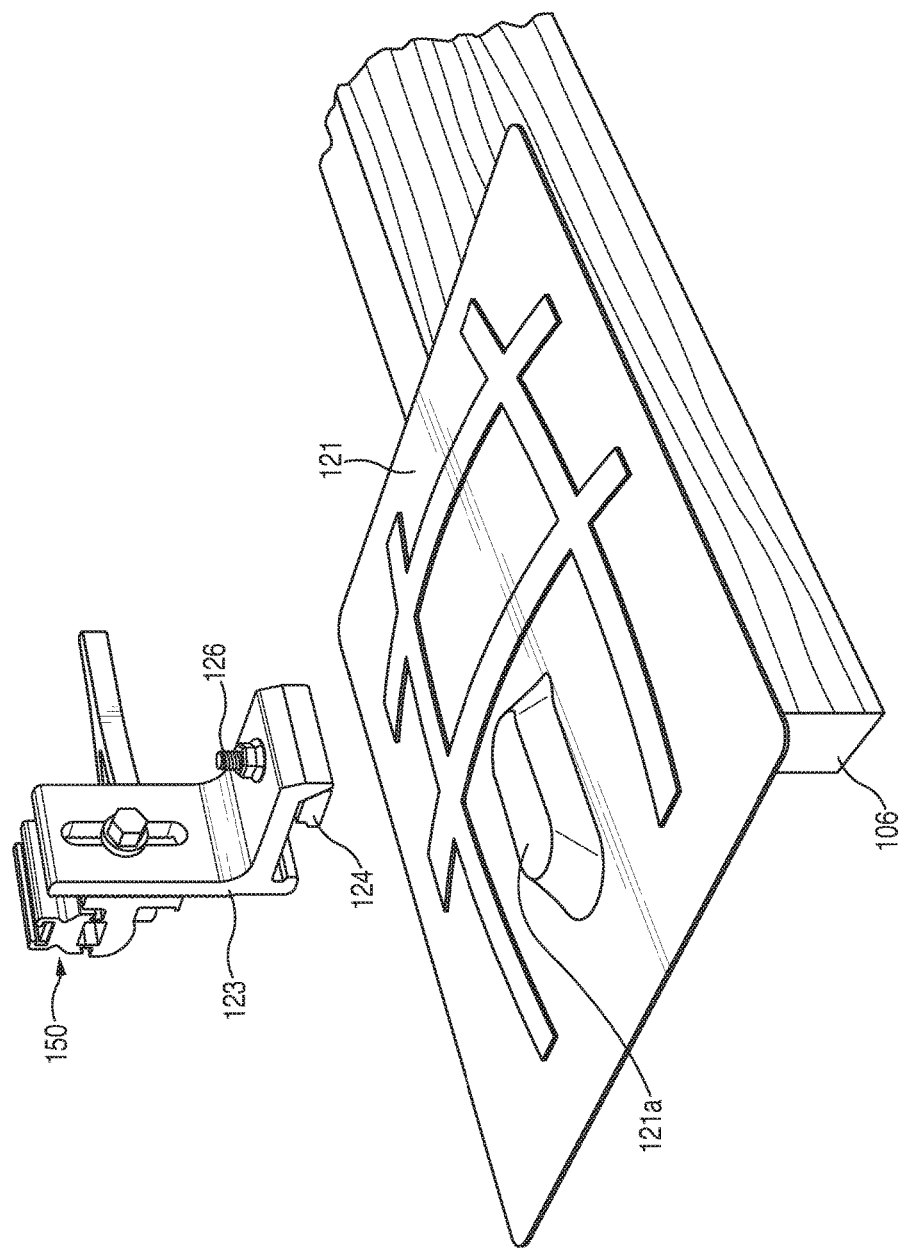
FIG. 4 shows an exploded perspective view of a portion of a solar panel installation system, in accordance with various embodiments.
Figure 5:
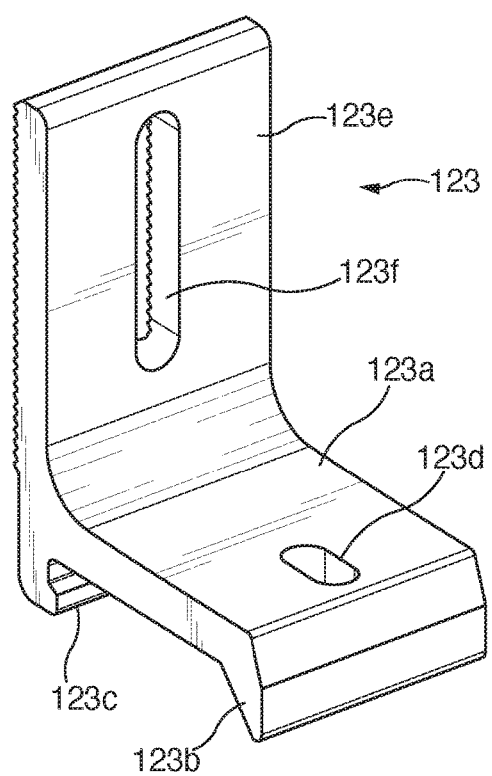
FIG. 5 shows a detailed perspective view of an L-foot, in accordance with various embodiments.
Figure 6:
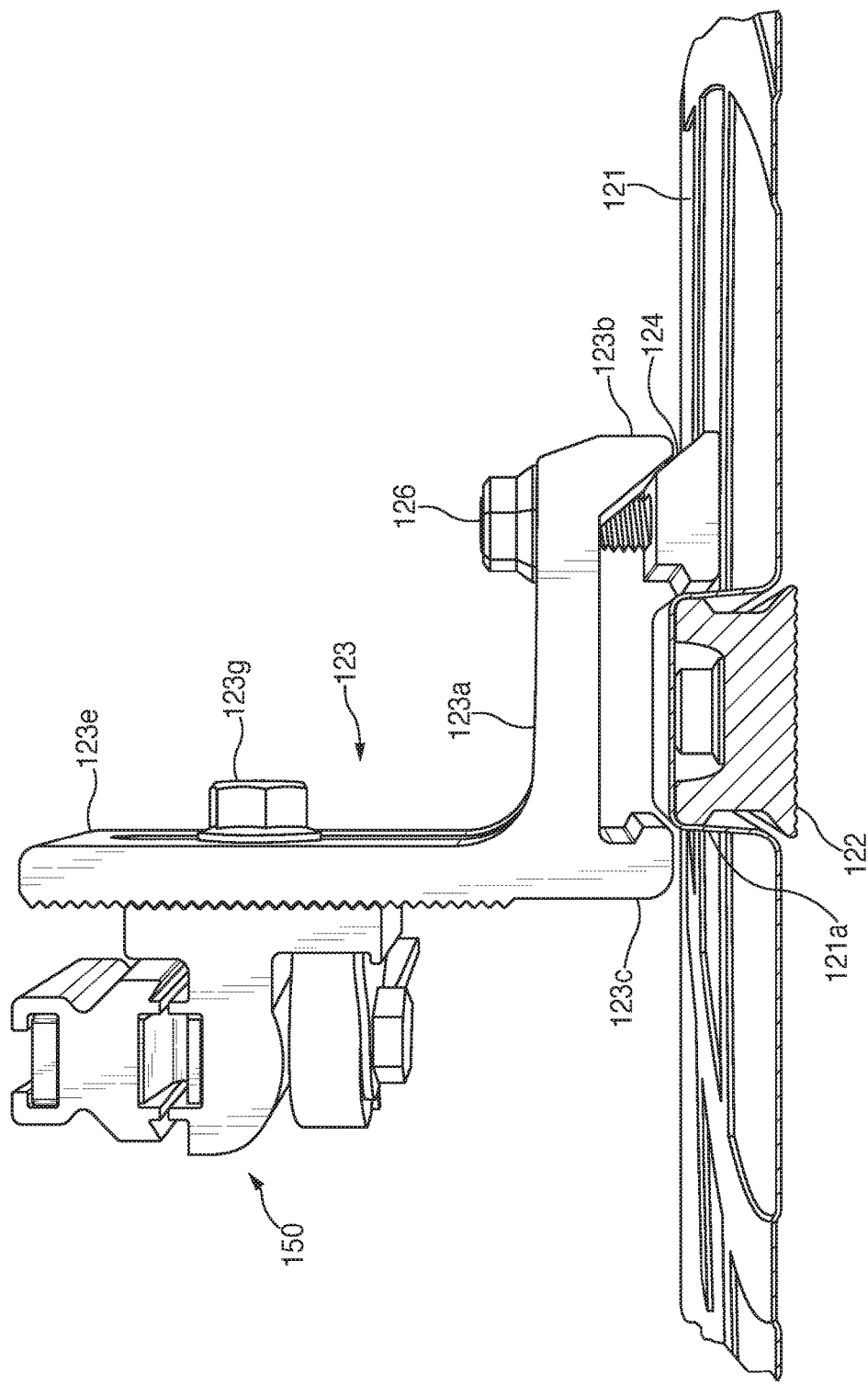
FIGS. 6 and 7 show cross sectional views of a portion of a solar panel installation system, in accordance with some embodiments.
Figure 7:
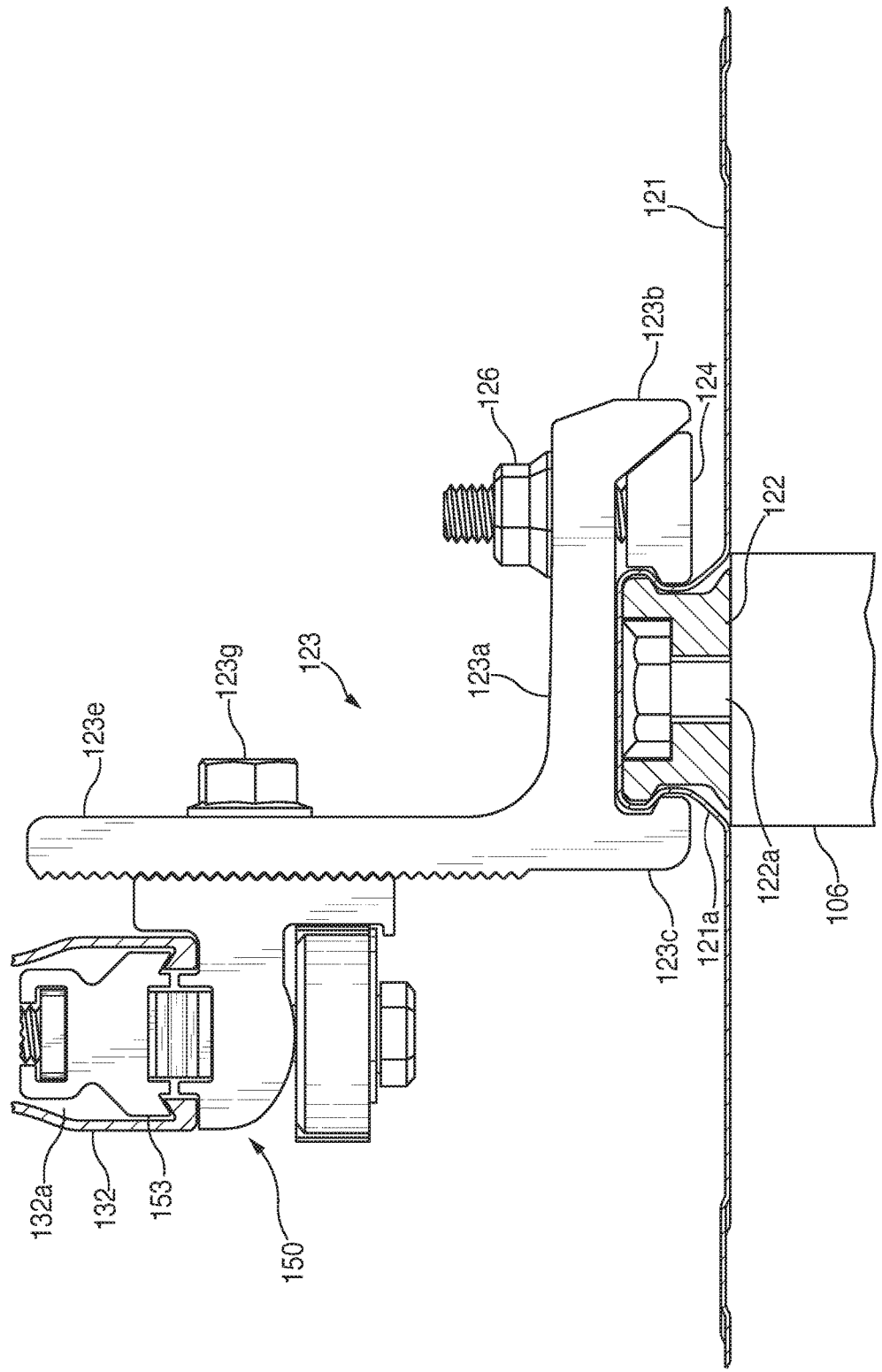

FIG. 4 shows an exploded perspective view and FIGS. 6 and 7 show cross sectional views of a portion of system 100, in accordance with some embodiments. FIG. 5 shows a detailed perspective view of clamping L-foot 123. As shown in FIGS. 4-7, L-foot base 122 and raised portion 121a of mounting plate 121 serve as the attachment point for clamping L-foot 123, which may support one or more other components of height-adjustable base member 120. Clamping L-foot 123 may include horizontal member 123a, clamping wedge 123b, base-engagement leg 123c, aperture 123d, vertical member 123e, and slot 123f formed in vertical member 123e. Clamping L-foot 123 can be coupled to L-foot base 122 through raised portion 121a using fastener 126.

Clamping wedge 123b and base-engagement leg 123c can extend away from horizontal member 123a in a direction approaching surface 104, as installed, with a space formed therebetween to accept L-foot base 122 and raised portion 121a. Base-engagement leg 123c may extend substantially perpendicularly from horizontal member 123a to engage a first side of L-foot base 122 and raised portion 121a. In embodiments in which L-foot base 122 has a keyed cross-sectional profile, the wall of base engagement leg 123c that engages L-foot base 122 may have a complementarily shaped profile to promote engagement between base engagement leg 123c and keyed channels of L-foot base 122, thereby preventing movement of clamping L-foot 123 relative to mounting base plate 121, especially in a direction extending substantially perpendicularly away from mounting base plate 121.

Clamping wedge 123b can include a sloped surface configured complementarily to a sloped surface 124 of base-coupling wedge 124. Fastener 126 can extend from base coupling wedge 124 through aperture 123d and can be secured in place with a nut. Alternatively, a fastener may be inserted through aperture 123d and threadably engage a threaded aperture formed in base-coupling wedge 124. In either case, fastener 126 is tightened, base-engagement leg 123c and base-coupling wedge 124 may be urged towards opposing sides of L-foot base 122, thereby coupling clamping L-foot 123 to L-foot base 122. As with base-engagement leg 123c, base-coupling wedge 124 may be shaped to form a keyed fit with keyed channels of L-foot base 122 to facilitate attachment therebetween. In some embodiments, the surfaces of clamping wedge 123b and of base-coupling wedge 124 that engage L-foot base 122 may include vertically-aligned grooves or ridges formed complementarily with similar grooves or ridges formed on L-foot base 122. These grooves or ridges may prevent lateral movement of height-adjustable base member 120 with respect to mounting base plate 121.

Once coupled to mounting base plate 121, clamping L-foot 123 may serve as a mounting point for one or more other components of system 100. For example, clamping L-foot 123 may support a slidable attachment member 130 using a lever-locking assembly 150.

Figure 8:
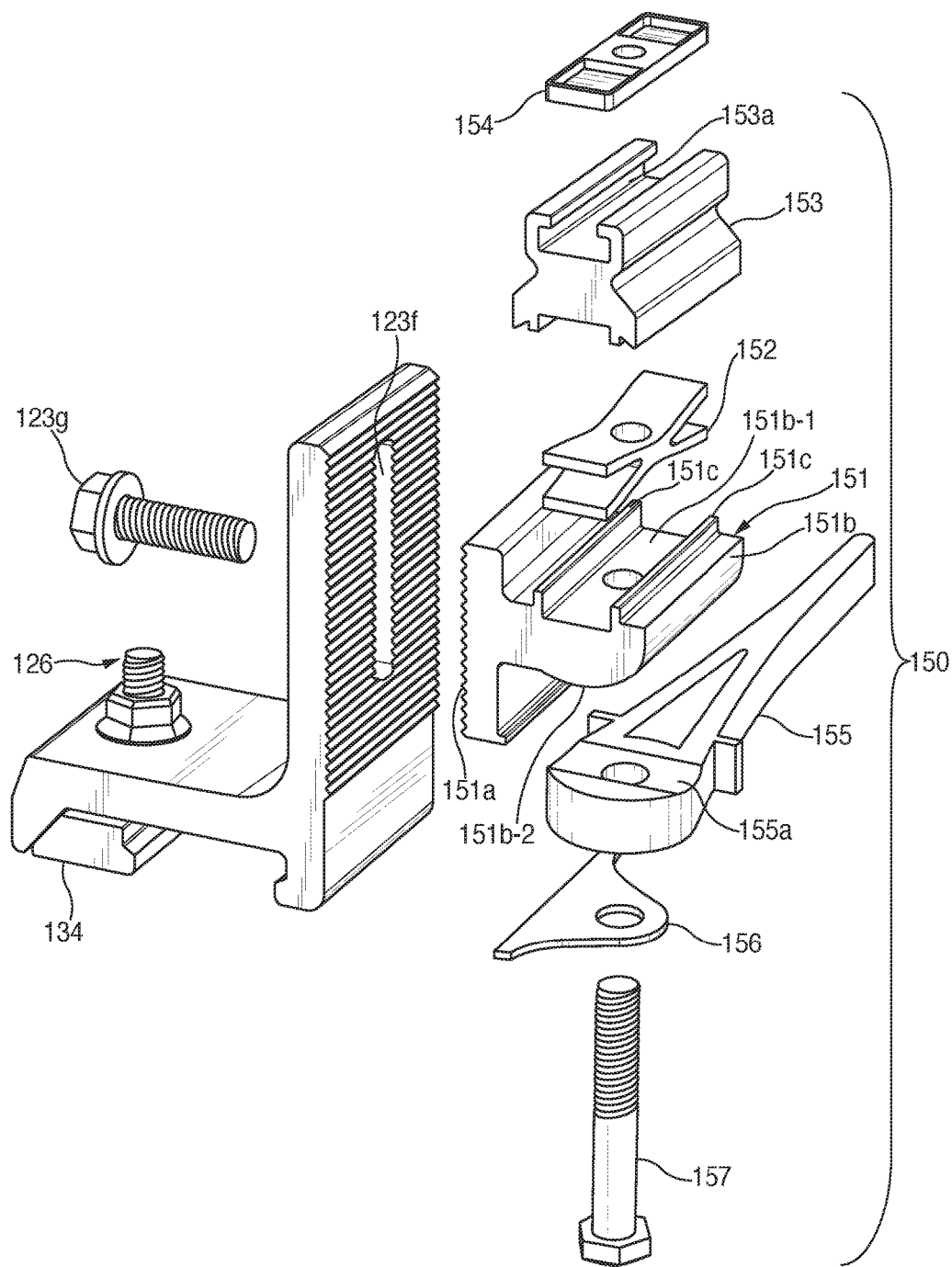
FIG. 8 shows an exploded view of a clamping L-foot and a lever-locking assembly, in accordance with various embodiments.

FIG. 8 shows an exploded view of clamping L-foot 123 and lever-locking assembly 150, in accordance with some embodiments. Lever-locking assembly 150 advantageously eliminates the need for tools to install framed solar panels by using lever-activated clamping action to lock slidable attachment member 130 in place. Together with the module links disclosed herein, lever-locking assembly 150 installation of a solar panel installation can proceed completely without the use of tools once the height-adjustable base members are attached to the installation surface. Lever-locking assembly 150 can include arm 151, captive spring 152, channel clamping member 153, channel nut 154, lever 155, traveling washer 156, and fastener 157.

Arm 151 can include mating surface 151a configured to be coupled to a surface of the vertically arranged portion of clamping L-foot 123 with fastener 123g, which may extend through slot 123f and into a threaded bore formed through mating surface 151a of arm 151. Mating surface 151a and the surface of the vertically arranged portion of clamping L-foot 123 are depicted as having complementarily ribbed surfaces to facilitate slip-free coupling between arm 151 and clamping L-foot 123.

Arm 151 may be generally T-shaped, with mating surface 151a arranged substantially perpendicular to slider support member 151b. Slider support member 151b can include a top side 151b-1, and a bottom side 151b-2, facing toward and away, respectively, from the installation surface, as installed. Top side 151b-1 includes retaining features 151c for retaining captive spring 152. As depicted in FIG. 8, retaining features 151c permit captive spring 152 to slide one-dimensionally with respect to top side 151b-1 in a direction substantially parallel to mating surface 151a. While retaining features 151c are depicted as walls in FIG. 8, any retaining features 151c can be any suitable features that prevent captive spring 152 from rotating with respect to arm 151.

Captive spring 152 is an X-shaped member located between top side 151b-1 and channel clamping member 153. The X shape of captive spring 152 causes forces exerted by and on the spring to be distributed evenly, thereby preventing undesirable torque on arm 151 or slidable attachment member 130.

Channel clamping member 153 rests atop captive spring 152. In the uncompressed position, captive spring 152 exerts a force on channel clamping member 153 that maintains channel clamping member 153 at a distance away from arm 151. When a force is applied to channel clamping member 153 in the direction of arm 151, the clamping member compresses captive spring 152 and moves toward top surface 151b-1.

The movement of channel clamping member 153 toward arm 151 provides a clamping force that locks slidable attachment member 130 in place with respect to height-adjustable base member 120 as may be appreciated with reference to FIG. 7. In particular, channel clamping member 153, which may be situated within channel 132a, can include two notches that receive flanges of rail 132. When no clamping force is present, the flanges of rail 132 loosely engage the notches of channel clamping member 153, thereby permitting one dimensional travel of the rail. When a clamping force is present, the notches clamp down on the respective flanges and lock slidable attachment member 130 in place.

Channel clamping member 153 may also include channel 153a for non-rotatably receiving channel nut 154. Channel nut 154 can include a threaded bore for receiving fastener 157. Fastener 157 extends through bores formed in each component of lever-locking assembly 150 until finally threadably engaging the threaded bore of channel nut 154. The initial tension on captive spring 152 is defined by how far fastener 154 is rotated into the threaded bore of channel nut 154. Preferably, the tension provided on captive spring 152 by fastener 157 permits rail 132 to slide freely with respect to lever-locking assembly 150 when no clamping force is present and locks rail 132 in place when a clamping force is present.

Lever-locking assembly 150 thus has two primary operational modes—a locked mode in which slidable attachment member 130 is locked in position relative to arm 151 and an adjustment mode in which slidable attachment member 130 is free to travel with respect to arm 151. Lever 155 selects between these two primary operational modes. Lever 155 works in conjunction with arm 151 and traveling washer 156 to force channel clamping member 153 toward arm 151, thereby clamping down on the flanges of rail 132 as described above. For this purpose, lever 155 is provided with a groove that is shaped complementarily to bottom side 151b-2 of arm 151. When the longitudinal axis of lever 155 is arranged substantially perpendicular to mating surface 151a, the convex-shaped bottom side 151b-2 of arm 151 rests in groove 155a, which extends along a transverse axis of lever 155 perpendicular to its longitudinal axis.

As lever 155 is rotated about its pivot point, which is located in groove 155a and defined by a bore that receives fastener 157, bottom side 151b-2 disengages from groove 155a, allowing top surface of lever 155 to bear against bottom side 151b-2. Because lever 155 is thicker measured at a normal to top surface than it is at groove 155a, lever 155, traveling washer 156, and the head of fastener 157 all move together away from arm 151. Because fastener 157 is in threaded engagement with channel nut 154, a force is then exerted on channel clamping member 153 in the same direction, thereby resulting finally in a clamping force on rail 132 that places lever-locking assembly 150 into its locked mode. Lever-locking assembly 150 can be returned to its adjustment mode by rotating lever 155 until bottom side 151b-2 once again rests in groove 155a, which releases the tension on captive spring 152 and relieves the clamping force on rail 132. In some embodiments, lever 155 is designed symmetrically.

Figure 9A:
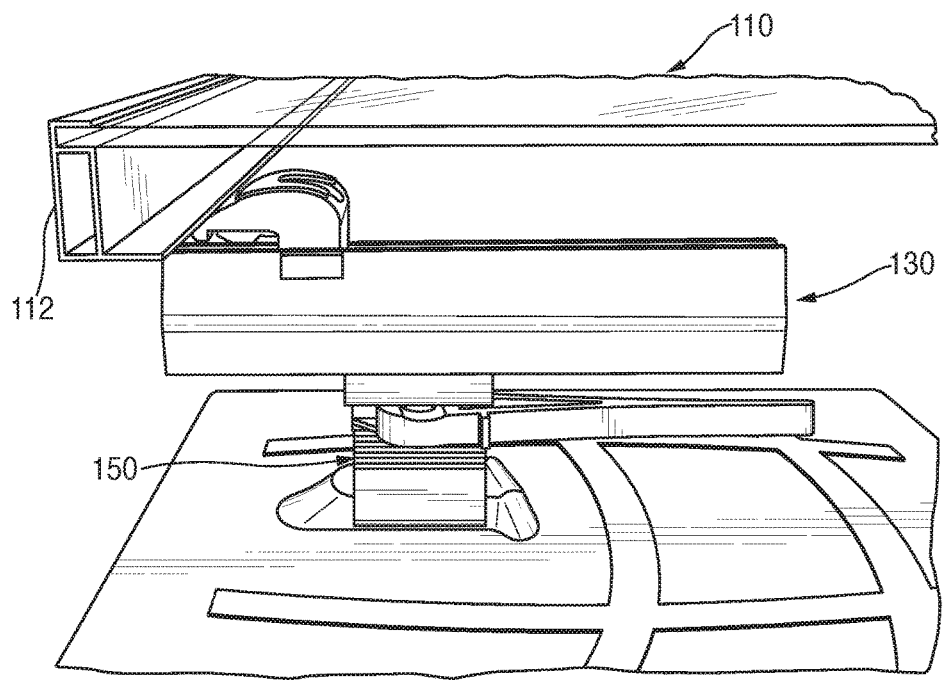
FIGS. 9A-9D show perspective views of a solar module being installed, in accordance with various embodiments.
Figure 9B:
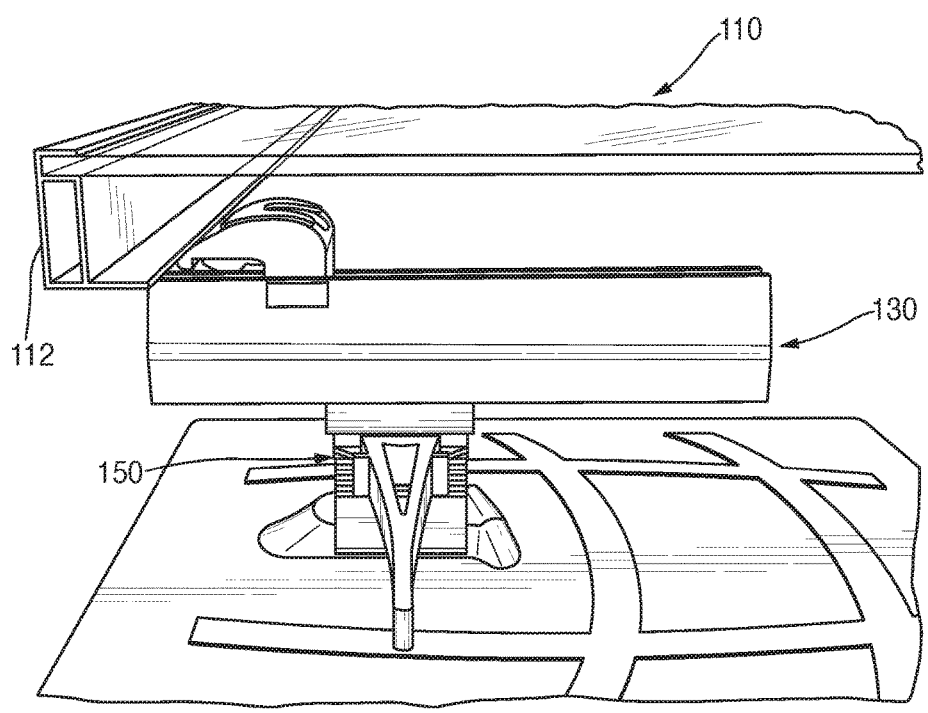
Figure 9C:
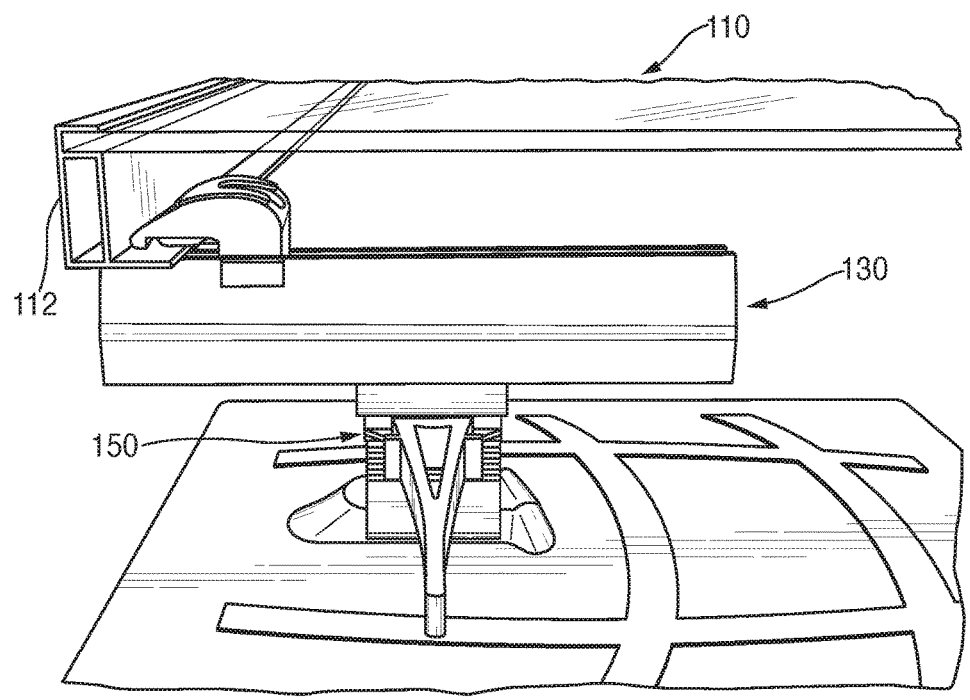
Figure 9D:
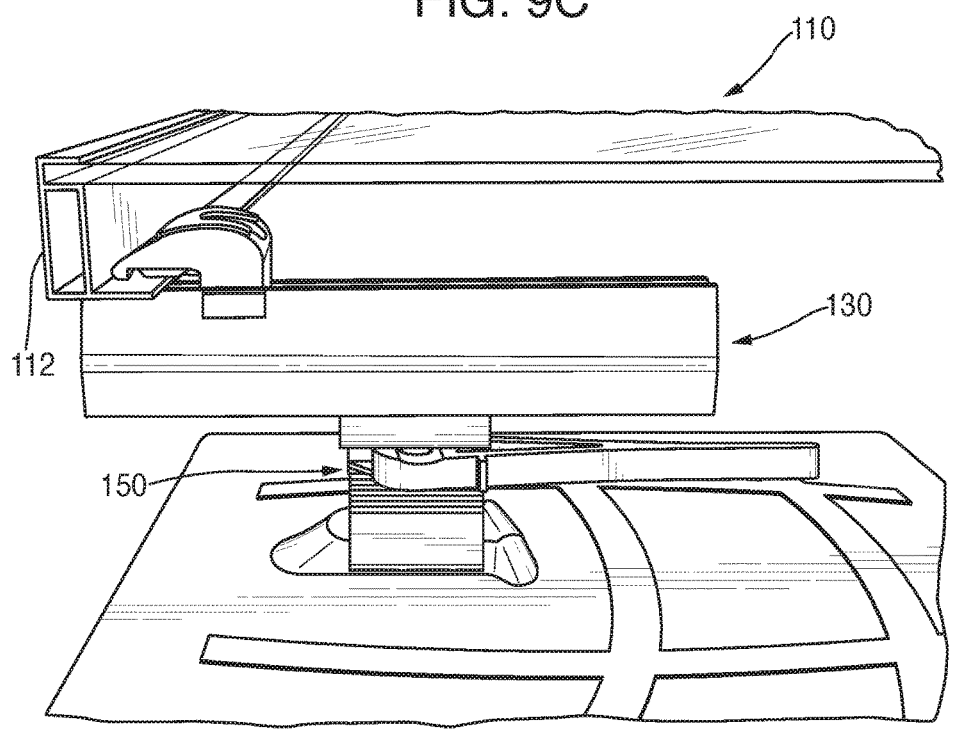

FIGS. 9A-9D show perspective views of solar module 110 being installed, in accordance with various embodiments. In particular, FIG. 9A depicts lever-locking assembly 150 in its locked mode with slidable attachment member 130 otherwise prepared to slide into engagement with frame 112 of solar module 110. In FIG. 9B, lever-locking assembly 150 has been switched into its adjustment mode in which slidable attachment member 130 is free to slide into engagement with frame 112 as depicted in FIG. 9C. In FIG. 9D, lever-locking assembly 150 has been switched back to its locked mode, thus completing attachment of solar module 110 to height adjustable base member 120.

Figure 10:
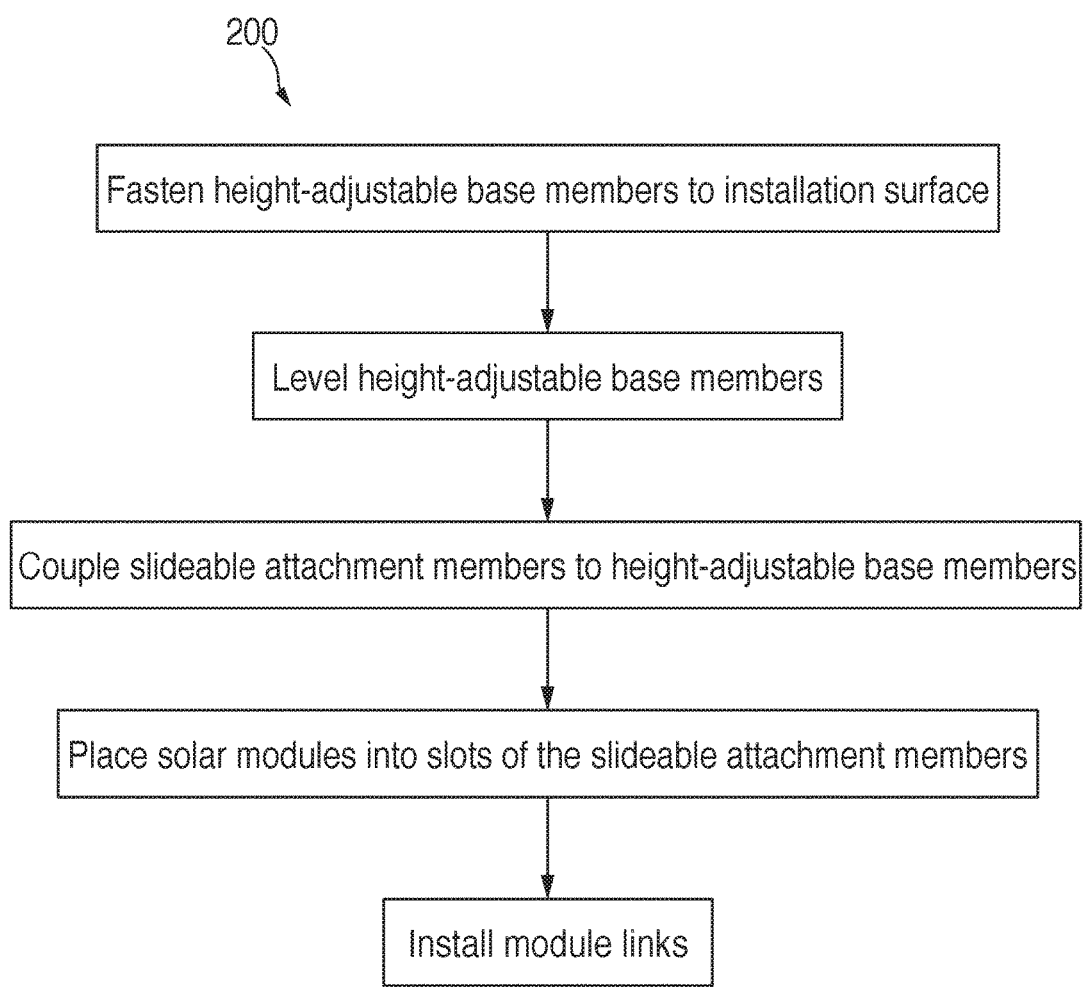
FIG. 10 shows a flowchart of an exemplary process 200 for assembling a solar panel installation, in accordance with various embodiments.

FIG. 10 shows a flowchart of an exemplary process 200 for assembling a solar panel installation, in accordance with some embodiments.

It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

What is claimed is:

1. A height-adjustable base member, comprising:
   an arm, comprising:
      a first side and a second side, wherein the second side has a convex surface; and
      a bore extending from the first side to the second side;
   a lever, comprising:
      a concave surface configured to engage with the arm in a first mode and a second mode, wherein in the first mode, the convex surface is engaged within the concave surface, and wherein in the second mode, the convex surface is disengaged from the concave surface; and
      a bore extending through the convex surface along an axis of rotation of the lever; and
   a fastener, inserted through the bores of the arm and the lever, coupling the arm to the lever.

2. The height-adjustable base member of claim 1, further comprising:
   a channel clamping member comprising a bore receiving the fastener, wherein the channel clamping member is pulled toward the first side in the second mode and pushed away from the first side in the first mode.

3. The height-adjustable base member of claim 2, further comprising:
   a captive spring arranged between the arm and the channel clamping member that bears against the channel clamping member to urge it away from the first side in the first mode.

4. The height-adjustable base member of claim 2, wherein:
   the channel clamping member comprises a bottom side arranged proximate to the first side and a top side arranged distal from the top side;
   the bottom side comprises two flanges;
   the top side comprises a channel; and
   a bore extends from the top side to the bottom side receiving the fastener.

5. The height-adjustable base member of claim 4, further comprising:
   a channel nut retained in the channel, the channel nut comprising a threaded bore for threadably receiving the fastener.

6. The height-adjustable base member of claim 4, further comprising:
   a rail comprising a channel slidably receiving the channel clamping member, wherein in the first mode the rail is adjustable in one dimension with respect to the channel clamping member, and wherein in the second mode the rail is locked with respect to the channel clamping member.

7. The height-adjustable base member of claim 6, wherein the rail comprises two rail flanges arranged at a distal end of the channel, wherein the two rail flanges complementarily engage the two flanges of the channel clamping member.

8. The height-adjustable base member of claim 1, further comprising:
   a traveling washer arranged between a head of the fastener and the lever.

9. The height-adjustable base member of claim 8, wherein the arm comprises a stop configured to limit the range of motion of the traveling washer when traveling between the first mode and the second mode.

10. The height adjustable base member of claim 1, further comprising:
    an L-foot comprising a horizontally arranged component and a vertically arranged component, wherein the arm is adjustably coupled to the vertically arranged component.

11. The height-adjustable base member of claim 10, wherein the arm and L-foot comprise textured mating surfaces.

* * * * *